United States Patent [19]

Vallvey et al.

[11] Patent Number: 5,030,285

[45] Date of Patent: Jul. 9, 1991

[54] CORROSION INHIBITING PIGMENT AND A PROCESS FOR THE MANUFACTURING THEREOF

[75] Inventors: Juan A. Vallvey, Barcelona; Oscar L. Francia, Blanes; Carlos M. Solé, Barcelona, all of Spain

[73] Assignee: Colores Hispania S.A., Barcelona, Spain

[21] Appl. No.: 313,573

[22] Filed: Feb. 22, 1989

[30] Foreign Application Priority Data

Mar. 3, 1988 [ES] Spain ................................. 8800634

[51] Int. Cl.$^5$ ...................... C04B 14/00; C04B 14/34; C09C 1/04; C09C 1/22
[52] U.S. Cl. ................................. 106/419; 106/14.05; 106/14.12; 106/459; 148/262; 423/305
[58] Field of Search ...................... 106/419, 459, 14.05, 106/14.12; 148/262; 413/305

[56] References Cited

U.S. PATENT DOCUMENTS

| | | | |
|---|---|---|---|
| 3,493,411 | 2/1970 | Clay | 106/419 |
| 4,294,808 | 10/1981 | Wasel-Nielen et al. | 106/419 |
| 4,330,345 | 5/1982 | Miles et al. | 148/262 |

FOREIGN PATENT DOCUMENTS

| | | | |
|---|---|---|---|
| 0795291 | 9/1968 | Canada | 148/262 |
| 2840820 | 4/1980 | Fed. Rep. of Germany | 106/419 |
| 0036267 | 3/1980 | Japan | 106/419 |
| 58-93879 | 6/1983 | Japan | 148/262 |
| 1265207 | 10/1986 | U.S.S.R. | 106/419 |
| 0487851 | 9/1936 | United Kingdom | 148/262 |

Primary Examiner—Paul Lieberman
Assistant Examiner—John Boyd
Attorney, Agent, or Firm—Sughrue, Mion, Zinn Macpeak & Seas

[57] ABSTRACT

The pigment comprises a mixture of crystalline phase and an amorphous phase in which the crystalline phase represents from 10 to 70 wt % of the mixture and is constituted by zinc phosphate in the form of substantially spheroidal particles having a maximum size of between 0.5 to 5 microns and the amorphous phase represents from 30 to 90 wt % and comprises ferric phosphate and ferrous phosphate in a mole ratio lying between 1:001 and 1:03.

The process comprises a reaction giving ferrous phosphate, partial oxidation thereof and association with zinc phosphate.

13 Claims, 5 Drawing Sheets

CORROSION INHIBITING PIGMENT AND A PROCESS FOR THE MANUFACTURING THEREOF

FIELD OF THE INVENTION

The invention relates to a corrosion inhibiting pigment and to a process for the preparation thereof, with which possible health problems which may arise with the use of the usual products up to date are avoided.

Hereinafter there are disclosed the successive findings, facts, experiments and knowledge which have led to the present invention.

BRIEF DESCRIPTION OF THE DRAWING

In the first place, reference is made to the accompanying figures, each of which is a graph showing, in abscissae, the time in weeks and, in ordinates, the weight loss in $g/cm^2$ of a test specimen when submerged in a salt solution similar to sea water in which the products to be tested have been introduced at a rate of 3 g/l.

Figure 5:
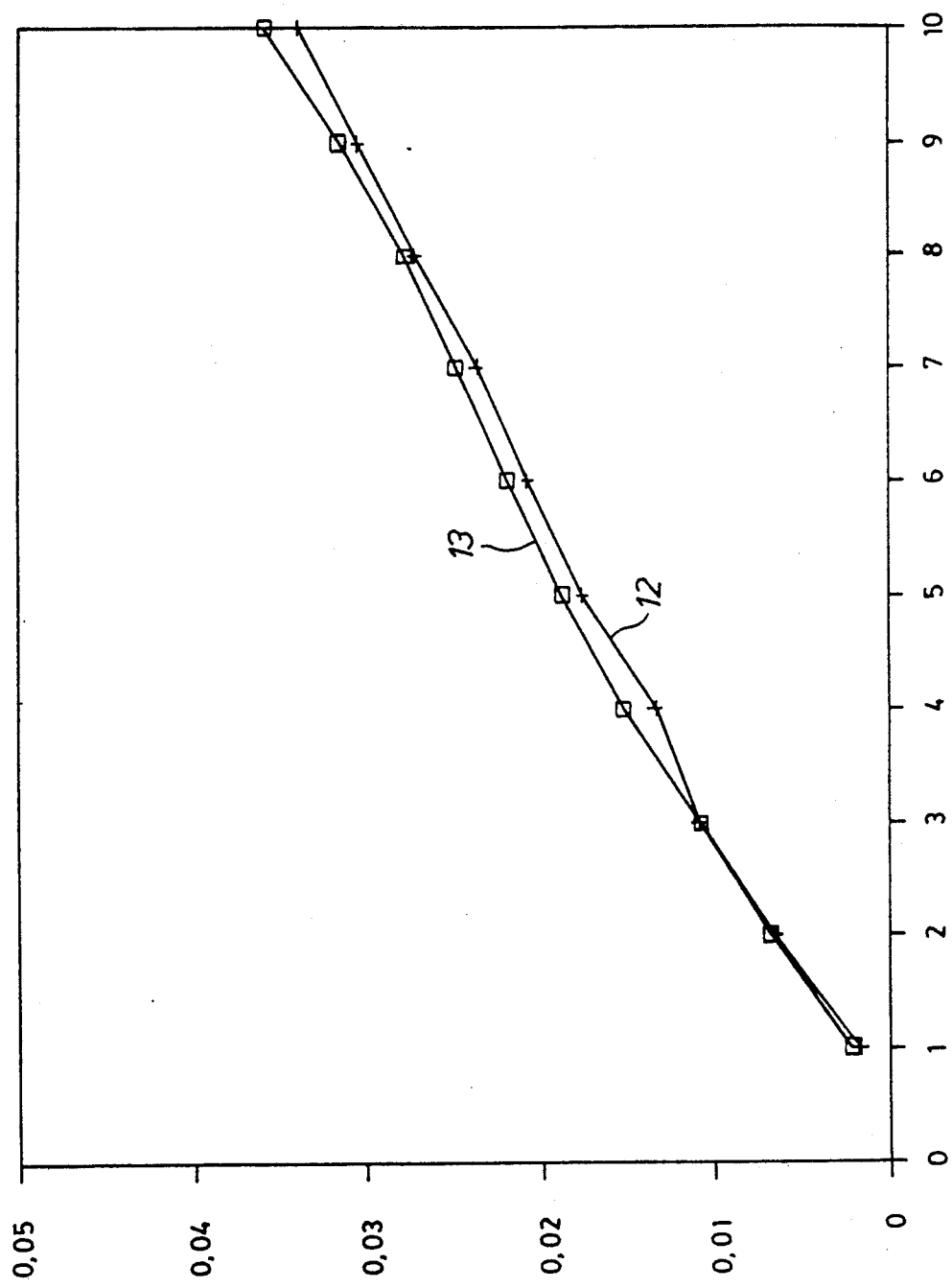

The plots of FIG. 5 correspond to solutions, as in the previous case, but in which the product to be tested comprises 60 wt % of said iron phosphates-comprising products and 40 wt % of zinc phosphate; lines 12 and 13 correspond to mole ratios of 1:0.1 and 1:0.02 respectively.

BACKGROUND OF THE INVENTION

Since the potential health hazards of certain hexavalent chrome compounds (zinc and strontium chromates particularly) became known, intensive research has been carried out to produce alternative corrosion inhibiting pigments which may be considered to be non-toxic. Nevertheless, none of the products that have appeared up to date have attained the high degree of efficiency shown by the chromates, above all in the accelerated tests which are absolutely necessary for evaluating the manufactured coatings or those under development, particularly the salt spray test. The most generally used of the alternative products proposed is zinc phosphate and this particular product evidences particularly unfavourable results vis-avis the chromates in the salt spray test and in the paint adherence tests after immersion of steel test specimens painted with said paints in distilled water. Furthermore, to achieve acceptable results, larger amounts of zinc phosphate than chromates have to be used.

Some more advanced products which have been introduced are based on modifications of the zinc phosphate composition. Nevertheless, all of them have drawbacks due, in general, either to the fact that they are pigments more basic than the common zinc phosphate, i.e. prepared with a large excess of zinc oxide, making them reactive to many of the binders used in the coatings industry, or to their including highly water soluble products in their composition, provoking the appearance of blisters in many coating systems, particularly when rather impermeable finish coats are applied over the primer.

Figure 1:
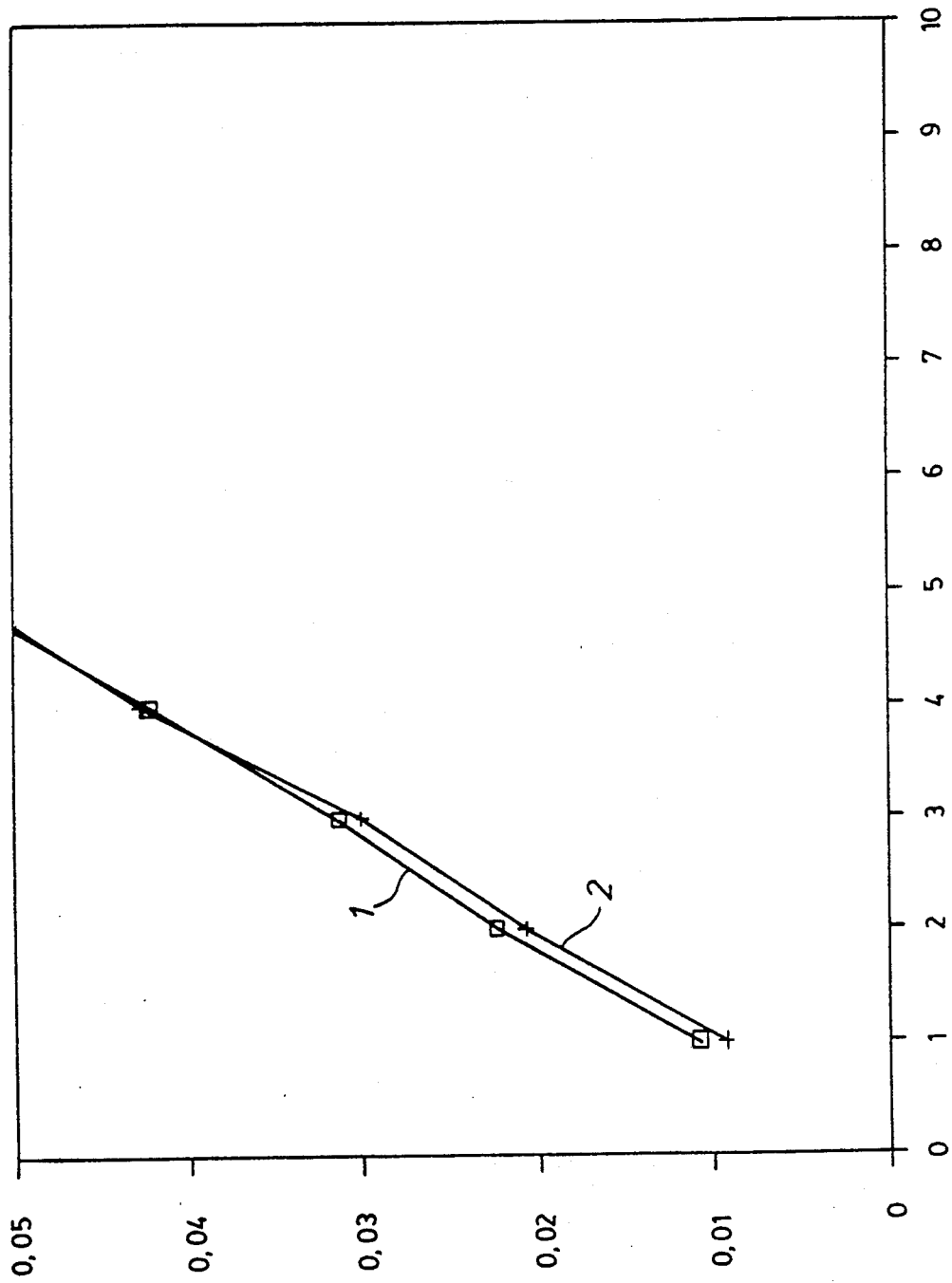
FIG. 1 is a graph of the type described, in which line 1 is the plot of a blank run, while line 2 is the plot of a ferric phosphate suspension.
Figure 2:
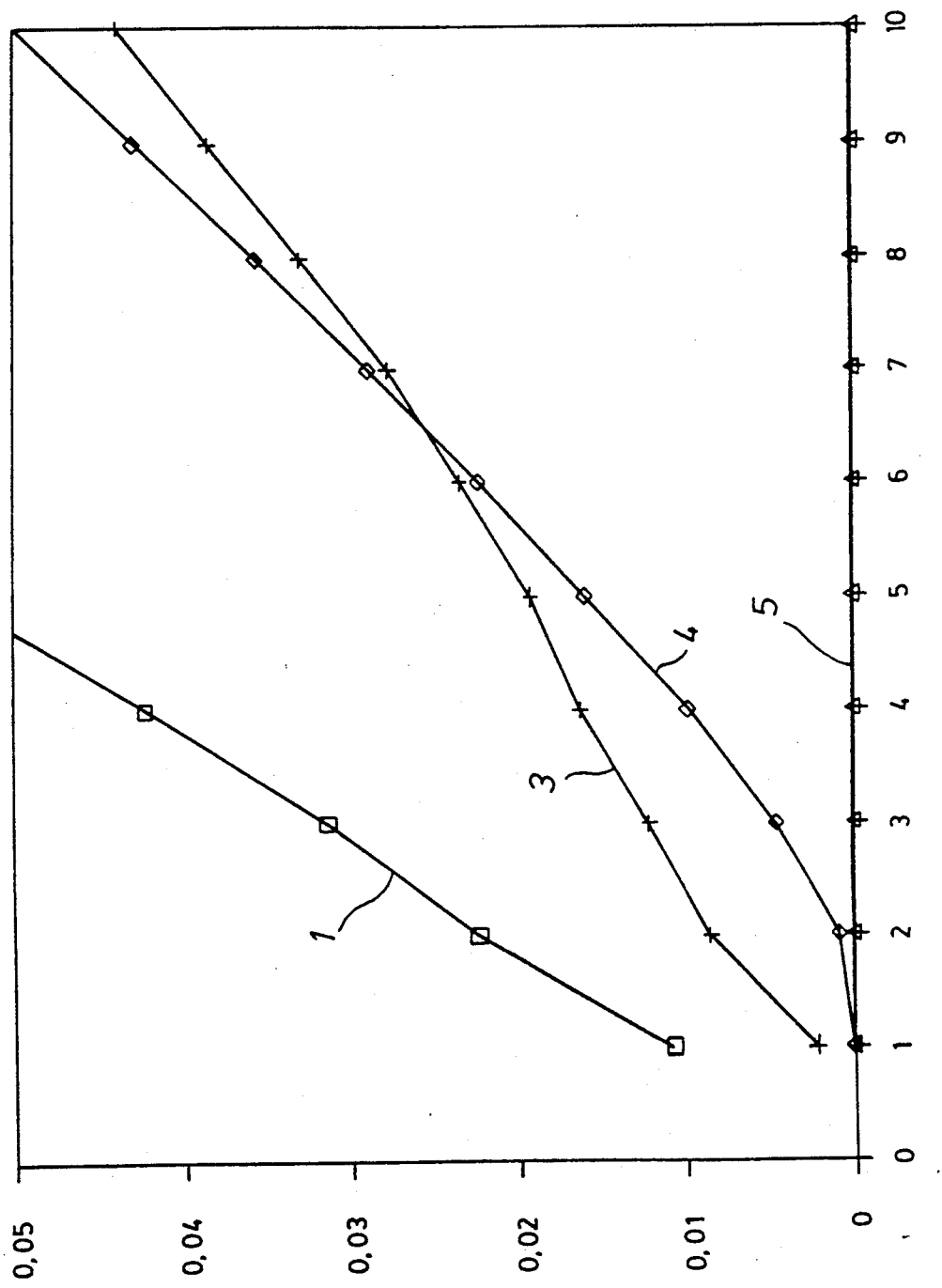
FIG. 2, line 1 is also a plot of a blank run, line 3 is a plot of a zinc phosphate slurry of the type generally available on the market, line 4 is a plot of an improved zinc phosphate slurry having a particular shape and particle size, and line 5, substantially coincident with the abscissae, is the plot of a zinc chromate slurry.

Other types of phosphates have been cited in the literature as potential corrosion inhibiting pigments, among them ferric phosphate ($FePO_4$). Nevertheless, the corrosion inhibiting activity of this product is non-existent, as shown by the fact that if a rolled steel test specimen, completely free from rust and any other surface pollutant, is dipped in a salt solution containing $NaCl$ and $MgCl_2$ in amounts similar to those found in sea water, with continuous bubbling of air throughout the test, and the weight loss vs time is periodically recorded, the weight loss evolves fully identically, both when no corrosion inhibitor has been added ("blank run") and when ferric phosphate had been added at a rate of 3 g/l of salt solution, a rate clearly in excess of saturation (see FIG. 1). On the other hand, when zinc chromate or strontium chromate are added at the same rate, the weight loss plot becomes much flatter, evidencing the existence of corrosion inhibition. The zinc phosphate generally available on the market gives a more favourable weight loss plot than in the blank run or with ferric phosphate, although comparatively very far from the chromates plot. Other improved zinc phosphates having essentially spheroidal elementary particles and sizes lying between 0.5 and 5 microns, may give slightly improved weight loss plots in turn relative to normal zinc phosphate.

DETAILED DESCRIPTION OF THE INVENTION

Figure 3:
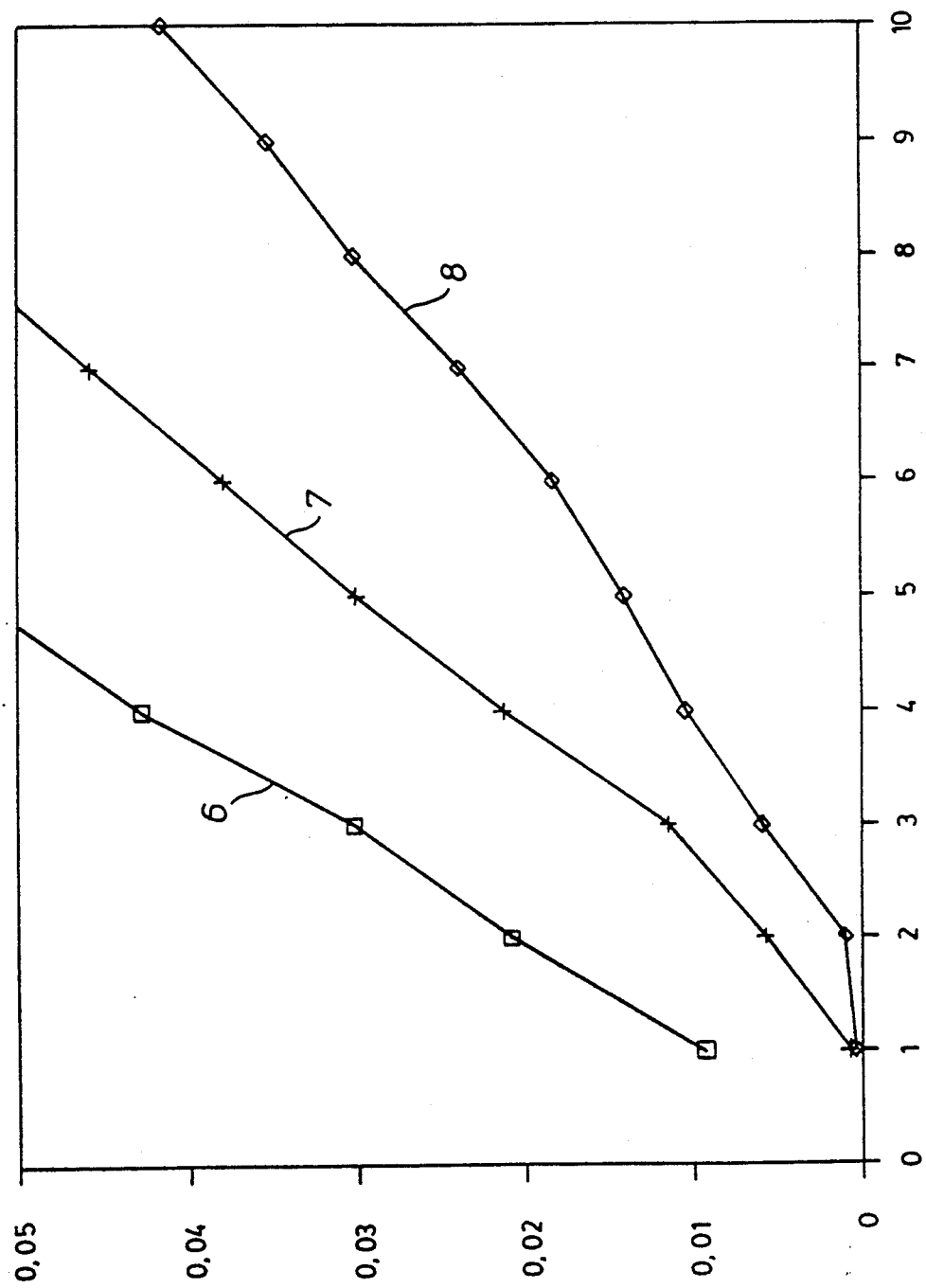
FIG. 3 contains plots of solutions containing products comprising ferric phosphate and ferrous phosphate; line 6 corresponds to mole ratios of 1:0 between said phosphates, line 7 to mole ratios of 1:0.02 and line 8 to mole ratios of 1:0.1.

A first finding is that if, in a test intended to monitor the effect of the presence of chemicals not comprising a coating on the corrosion rate of steel test specimens submerged in a salt solution, the weight loss of steel test specimens free from rust and other surface pollutants submerged in a $NaCl$ and $MgCl_2$ salt solution in amounts similar to sea water is tested, with continuous bubbling of air throughout the test, in the presence of 3g/l of ferric phosphate ($FePO_4$) and ferrous phosphate ($Fe_3(PO_4)_2$) containing products in mole ratios lying between 1:0.001 and 0.001:1, respectively, the test specimen evidences in the initial stage of the experiment an evolution depending on the ferrous ion content of the product, varying from a behaviour similar to that of the blank run, as above, to a behaviour better than that of an improved zinc phosphate when the ferrous ion is present in an increasingly larger amount, i.e., with mole ratios lying between 1:0.10 and 0:1 (see FIG. 3).

To prepare a ferric phosphate ($FePO_4$) and ferrous phosphate ($Fe_3(PO_4)_2$) containing product in the above mentioned mole ratios, it is particularly practical and advantageous, and here is a second finding, to start out from a ferrous sulphate solution, a cheap, easily obtainable raw material, precipitate it with the stoichiometric amounts of phosphoric acid and caustic soda required to obtain ferrous phosphate and, after washing out the sodium phosphate formed, dry the ferrous phosphate under temperature, moisture and time conditions allowing oxidation of the major portion of the ferrous ion to ferric ion, following the reaction $4Fe_3(PO_4)_2 + 3O_2 \rightarrow 8FePO_4 + 2Fe_2O_3$.

Figure 4:
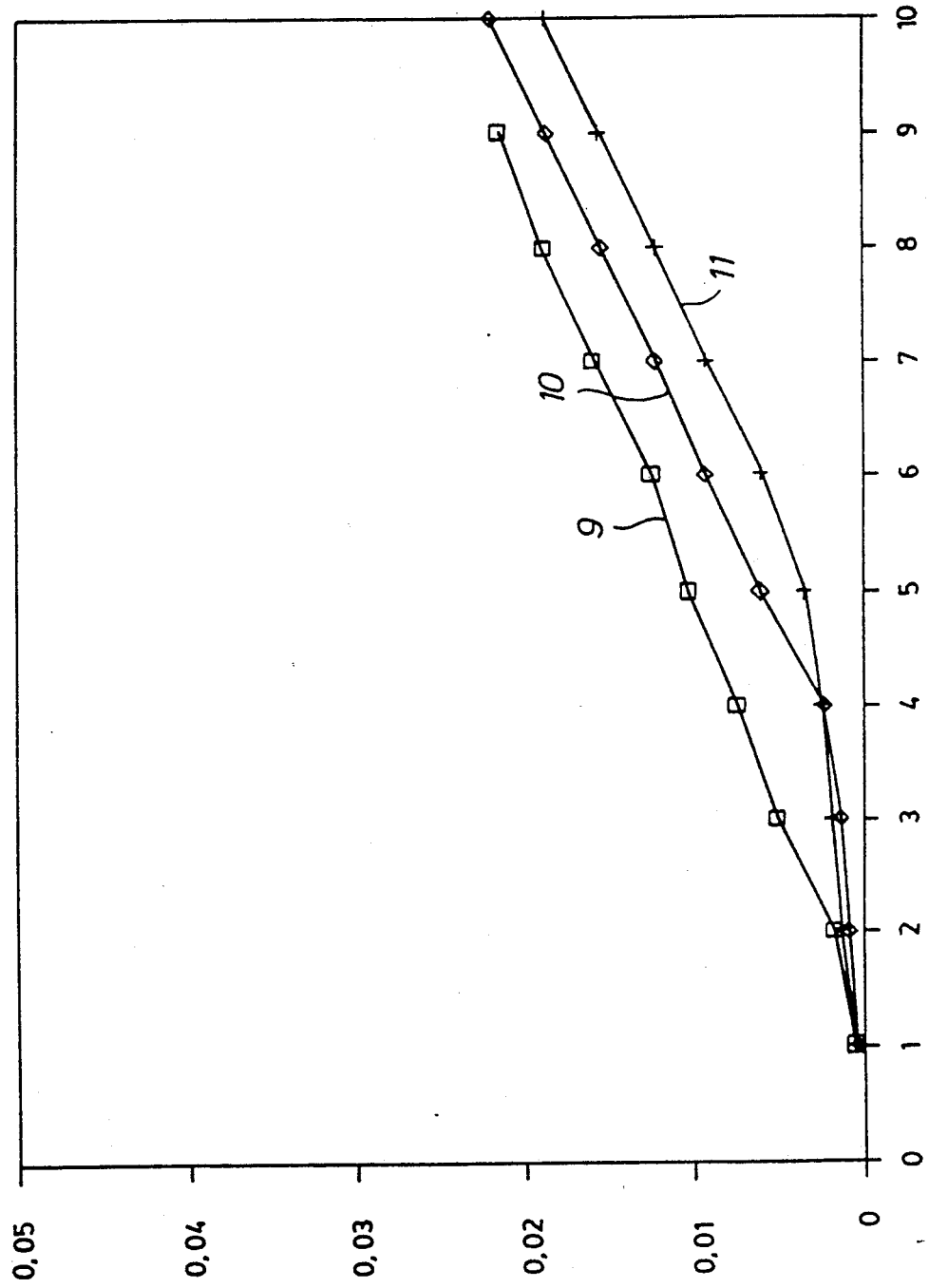
FIG. 4 contains the plots of solutions containing zinc phosphate and also containing said products comprising ferric phosphate and ferrous phosphate; for the mole ratios of these iron salts of 1:0.0015, 1:0.1 and 1:0.02, lines 9, 10 and 11 are obtained, respectively. This figure relates to solutions in which the product to be tested comprises 40 wt % of zinc phosphate and 60 wt % of of said iron phosphates-comprising products.

A third finding is that, when testing the weight loss of a steel test specimen, free from rust and other surface pollutants, submerged in a NaCl and $MgCl_2$ solution in proportions similar to those found in sea water, with continuous bubbling of air throughout the test, in the presence of 3 g/l of a mixture of from 1 to 5 parts by weight of zinc phosphate and of from 9 to 5 parts by weight of ferric phosphate ($FePO_4$) and ferrous phosphate ($Fe_3(PO_4)_2$) containing products, in mole ratios lying between 1:0.001 and 0:1 respectively, the weight loss vs time plots are always better than those provided both by zinc phosphate alone and by the product based only on iron phosphates. Surprisingly, almost insignificant amounts of ferrous ion ($Fe^{++}$) in the product provide an excellent behaviour, even though the majority compound of ferric ion ($Fe^{+++}$) is clearly inactive. The same happens if the zinc phosphate used is one of the aforementioned improved ones, an even greater efficacy being obtained in this case, although it is observed that the effect of the mixture is always better than that of the separate components (see FIG. 4). However, when the mixtures contain more than 5 parts out of 10 of zinc phosphate, even when it is one of the improved ones, and less than 5 parts of the iron phosphate based product, the results resemble those of zinc phosphate used alone, without providing any other improvement (see FIG. 5). It is obvious, therefore, that the triple relationship between the zinc phosphate, ferric phosphate and ferrous phosphate contents determines an optimum surprising behaviour for the product.

It was said above that one of the limitations of the zinc phosphate generally available on the market is the poor adherence of the paints containing it, which is appreciated in a particularly spectacular way in immersion tests in distilled water at moderately high temperatures (e.g. 50° C.) of steel test specimens painted with systems formed by a corrosion inhibiting primer pigmented with this product and a finish coat selected from among the most impervious to water types it is possible to obtain on the market. On the contrary, the chromates provide an excellent adherence although, because of their solubility, they produce blisters, which are small and numerous in the case of strontium chromate and larger, although less numerous, in the case of zinc chromate. If an inert product, such as natural or synthetic red iron oxide is tested, the result is faulty adherence, a large number of blisters and, furthermore, a rust stain is observed on the steel surface below each blister.

A fourth finding is that, when carrying out immersion tests in distilled water at 50° C. with specimens painted with:

(a) a primer containing as corrosion inhibiting pigment a product formed by 1 to 7 parts of zinc phosphate and 9 to 3 parts by weight of ferric phosphate ($FePO_4$) and ferrous phosphate ($Fe_3(PO_4)_2$) containing products in mole ratios lying between 1:0.3 and 1:0.001, respectively; and (b) a more impermeable finish coat equal to the one used in the abovementioned examples, the surprising result at the end of the test is adherence equivalent to that provided by the chromates, complete absence of blistering — unlike the chromates—and complete absence of rust stains on the metal surface.

Zinc phosphate, apart from the poor adherence of the paints containing it and, partly as a consequence thereof, suffers from the drawbacks mentioned at the beginning of poor resistence to the salt spray tests and the need to use large amounts of pigment when it is wanted to obtain satisfactory results. This is due to its low solubility and very slow corrosion inhibiting action, as has been evidenced on studying the weight loss of unpainted steel test specimens submerged in a salt solution. On the other hand, ferrous phosphate ($Fe_3(PO_4)_2$) effectively showed a clear inhibitory behaviour in the same salt solution immersion tests. However, if this product is used directly in the pigmentation of a corrosion inhibiting primer, its high solubility gives rise to a catastrophic behaviour, with generalised corrosion when such primer is tested in salt spray, without finish coat, and blistering when it is tested under a more impermeable finish coat.

A fifth finding is that when the paints pigmented with a product formed by from 1 to 7 parts of special zinc phosphate, as for example the one described above (small spheroidal particle) and from 9 to 3 parts by weight of ferric phosphate ($FePO_4$) and ferrous phosphate ($Fe_3(PO_4)_2$) containing products in mole ratios of between 1:0.3 and 1:0.001 respectively, in a salt spray, results are obtained which stand up surprisingly in all aspects to the results obtained with primers pigmented with the same amount of chromate based pigments and in certain aspects even improve upon them. Particularly, if the approximately 10 wt % zinc chromate contained in the formula of an air drying anti-corrosive primer is replaced by the same amount of a pigment according to the invention, the adherence and corrosion control results after 400 hours in salt mist are superior to those of zinc chromate, both if the primer alone (single coat system) is tested and if it is tested under a more impermeable finish coat (two-coat system).

Finally, a sixth finding is that the improvement obtained when using a product formed by 1 to 7 parts of a special small particle zinc phosphate and from 9 to 3 parts by weight of ferric phosphate ($FePO_4$) and ferrous phosphate ($Fe_3(PO_4)_2$) containing products in mole ratios of between 1:0.3 and 1:00.1 respectively, is much more evident when the two types of phosphate (zinc and iron) are mixed dry after drying each of the components under the most appropriate conditions therefor, than when the two products are co-precipitated or when they are mixed together while both are still aqueous slurry and are dried after being mixed.

The result of the foregoing is the preparation of an anti-corrosive pigment characterised by comprising a mixture of a crystalline phase and an amorphous phase in which the crystalline phase represents from 10 to 70 wt% of the mixture and is constituted by zinc phosphate in the form of substantially spheroidal particles of a maximum size of between 0.5 and 5 microns and the amorphous phase represents from 30 to 90 wt % and comprises ferric phosphate and ferrous phosphate in a mole ratio lying between 1:0..001 and 1:0.3.

According to a preferred feature of the invention, said substantially spheroidal particles have a rough surface and are formed by laminar microcrystals of zinc phosphate disposed generally radially, showing an oil absorption lying between 55 and 90 when determined according to ISO/R 787.

Also according to the invention, said amorphous phase consists of a hydrated powdered product formed by particles of a size not above 15 microns.

Furthermore, the invention provides a process for the manufacture of an anti-corrosive pigment constituted by an association of a crystalline phase and an amorphous phase, in which the crystalline phase represents from 10 to 70 wt % of the association and is constituted by zinc phosphate in the form of substantially spheroid particles having maximum dimensions lying between 0.5 and 5 microns and the amorphous phase represents from 30 to 90 wt % of the association and comprises ferric phosphate and ferrous phosphate in a mole ratio lying between 1:0.001 and 1:0.3, characterised in that it comprises the following steps, listed without implying any particular order of performance: (a) reacting a ferrous salt with phosphate ion containing product to give ferrous phosphate; (b) washing said ferrous phosphate; (c) drying and oxidising said ferrous phosphate, to give an oxidised product maintaining a divalent iron content lying between 0.2% and 47 wt % of the total iron present in the oxidised product; and (d) associating the above with a crystalline phase constituted by zinc phosphate.

According to one way of reducing the invention to practice, said associating step (d) is carried out with zinc phosphate and said oxidised product, while alternatively, said associating is carried out with the zinc phosphate and the ferrous phosphate.

Therefore, the invention provides the following advantages:

1. the preparation of a non-toxic anti-corrosive pigment which, surprisingly, in spite of the low solubility thereof, allows zinc chromate to be replaced weight for weight in room temperature drying coatings, while retaining or improving upon the results of the latter.

2. the preparation of a non-toxic pigment allowing the formulation of paints providing good results in the salt spray test, both when tested in a single coat system (exclusively the primer) or in a two coat system (with a finish coat over the primer).

3. the preparation of a non-toxic pigment allowing the formulation of paints providing good adherence on steel after immersion tests in distilled water at moderate temperatures (50° C., e.g.) on steel sheet painted with a complete system of anti-corrosive primer of high chemical resistance and a highly impermeable finish, and affording, furthermore, complete absence of blistering at the end of the test, together with the absence of rust stains on the substrate surface.

4. a process in which an iron phosphate based product may most advantageously be prepared from cheap, easily obtainable raw materials, with the ideal proportions of ferric and ferrous ions required for them to be able to form jointly an anti-corrosive pigment having optimized behaviour when used together with the appropriate amount of zinc phosphate.

5. An anti-corrosive pigment in which the mixture of the ferric, ferrous and zinc phosphates constituting it is most efficaceous.

Furthermore, the fundamental findings giving rise to the above achievements may be summarised as follows:

1. The ferric phosphate ($FePO_4$) which is, of itself, inert as an allegedly corrosion inhibiting pigment, becomes active with the inclusion of a certain amount of ferrous ion. This is particularly easy to effect by way of controlled oxidation, to a specified degree, of the precipitate obtained from stoichiometric amounts of appropriate reactants to obtain ferrous phosphate ($Fe_3(PO_4)_2$). Such oxidation control may be carried out by a specially designed drying system. In this case, the resulting ferric phosphate and ferrous phosphate containing product also contains iron oxide ($Fe_2O_3$) in an amount derived from the reaction:

$$4Fe_3(PO_4)_2 + 3O_2 \rightarrow 8FePO_4 + 2Fe_2O_3$$

Said iron oxide is amorphous in comparison with the crystalline product commercially available as pigment. Therefore, the pigment of the invention has, in this case, an amorphous iron oxide content, contributing to an improved packaging of the ensemble of pigments and fillers in the paint film. Nevertheless, the chemically most important factor is the joint presence of $Fe^{+++}$ and $Fe^{++}$ ions, which may be obtained by other processes.

2. When an amorphous ferric and ferrous phosphate containing product like those described above is used jointly with zinc phosphate, it produces a behaviour which is at least equivalent to that of zinc phosphate. However, when said amorphous ferric and ferrous phosphate containing product is the major ingredient of the mix with zinc phosphate, then the result is clearly better than with the latter alone, even, surprisingly, for amorphous products with lower ferrous ion ($Fe^{++}$) content.

3. The best behaviour of the product composed of ferric and ferrous phosphates and zinc phosphate is obtained when the mixture is prepared from separately prepared iron and zinc compounds, each dried under the most appropriate conditions therefor.

EXAMPLE 1

Solutions of (a) 612 g of 98% $FeSO_4.7H_2O$, diluted to 4000 ml; and (b) 99.6 ml of 80.41% $H_3PO_4$ and 166 g of NaOH, diluted to 4200 ml were prepared. The latter solution was poured over the former over a period of 10 minutes, with stirring, the pH being held at 7. Once the pouring was over, the stirring was maintained for 1 hour, at room temperature. At the end of this time, the precipitate obtained was washed with water until the conductivity of the washing liquors was 300 µS. Subsequently, the washed precipitate had to be dried, for example at 80° C., the end product being observed until the ferrous ion ($Fe^{++}$) content was between 0.5 and 1.0% of the total Fe present. With this process, 314 g of an amorphous product formed by 249.2 g of hydrated ferric/ferrous phosphate and 69.2 g of ferric oxide were obtained. Under certain conditions, the phosphoric acid may be replaced by a soluble salt of said acid.

Thereafter 300 g of the thus obtained product were mixed with 200 g of a zinc phosphate of essentially spherical particles, of a size lying between 1.5 and 5 microns and with an oil absorption of 70 g per 100 g pigment. Said mixture is subsequently subjected to joint micronization, to give a beige coloured pigment suitable for use in paint manufacture, hereinafter called "Pigment 1A".

EXAMPLE 2

The process of Example 1, using identical solutions to those described at the beginning thereof, was followed up to the time when, one hour after pouring, the stirring of the ferrous phosphate precipitate at room temperature was interrupted. In the meantime, a zinc phosphate was prepared from, on the one hand, a paste of 130.6 g of finely dispersed zinc oxide in 660 ml of water at 60° C., with the aid of a potent mechanical stirrer and, on the other hand, a mixture of 66.9 ml of phosphoric acid (d=1.631) with 52.2 g of ammonium chloride diluted to 272 ml, also with heating to 60° C., both fluids being then poured over a period of 35 minutes in a continuous stirred reactor, under conditions such that there was always a considerable excess of zinc oxide, the precipitate being subsequently developed with stirring for a further 40 minutes, after which the pH was adjusted to 7. When the zinc phosphate precipitate reached room temperature, it was poured over the precipitated ferrous phosphate and both precipitates were mixed until perfectly homogenous, after which the product obtained was filtered and washed until the chlorides were removed. Thereafter the product was dried at 80°-90° C. to give 585.7 g of a beige coloured product which was then micronised under conditions identical to those used for "Pigment 1A". This new pigment was called "Pigment 1B".

These products were used in the tests explained below:

(1) Paint salt spray exposure tests:

A paint appropriate for use as an air drying corrosion inhibiting primer was prepared in a laboratory sand mill, with the following formula (wt %):

| | |
|---|---|
| Zinc chromate | 10.28% |
| Calcium carbonate | 7.35% |
| TiO2 rutile | 12.05% |
| Micronized talc | 8.14% |
| Dehydrated castor oil medium-short alkyd resin modified with phenolic resin (solids) | 24.01% |
| Xylene (in resin solvent form) | 16.01% |
| Xylene (as paint thinner) | 19.23% |
| Ca naphthenate | 1.44% |
| Co naphthenate | 0.24% |
| Pb naphthenate | 0.48% |
| Anti-skinning agent | 0.78% |

Cold rolled steel sheet, previously abraded and degreased to be free from rust and any other surface pollutant, was painted to a dry coat thickness of 35 microns. Certain sheets had applied over the primer a coat of an air drying linseed oil long alkyd paint, pigmented with TiO2 to a pigment concentration of 20% by volume, representing a common commercially available finish.

A further three paints, having the same weight percentage formula as the zinc chromate paint, were prepared, with the sole exception that the zinc chromate was replaced in one of them by the same amount of "Pigment 1A" prepared as described in Example 1, was again replaced in the second paint by the same amount of "Pigment 1B", preparation of which was also described in Example 2, and was further replaced in the third one by the same amount of a mixture of inert pigments formed by barytes, calcium carbonate, TiO2 rutile and micronized talc in equal proportions. Steel sheet test specimens, completely similar to those described for the zinc chromate paint, were painted with the above described three paints.

After the specimens corresponding to the four paints (pigmented respectively with zinc chromate, Pigment 1A, Pigment 1B and with the inert pigment mixture) has been subjected to the salt spray test as per ASTM D-117, the results were as follows:

(a) single coat application systems (primer alone):
After 100 hours test, the sheet painted with primer in which the zinc chromate had been replaced by the inert pigment mixture was already clearly deteriorated, corrosion being observed both at the sides of the scratches habitually made on test specimens subjected to the salt spray test, and in areas distant from said scratches.

After 400 hours, the sheets painted with the zinc chromate primer and with the primer in which said pigment had been replaced by "Pigment 1A" prepared as per Example 1, had a very good appearance, without any deterioration away from the 1 mm wide strip extending along each of the scratches made in the paint film being observable. The specimens painted with the primer in which the zinc chromate had been replaced by the "Pigment 1B" showed some signs of rust on different parts of the surface thereof and, although the behaviour of this paint is clearly better than that of the one containing the inert pigment mixture, it does not attain the level of zinc chromate, unlike what was observed for "Pigment 1A".

The steel specimens were removed from the salt spray, were washed in distilled water and thoroughly dried. An adherence test was carried out after 24 hours, using the regular process of the paint industry of scratching a square with an appropriate sharp instrument and observing the ease with which the paint around the edges of the scratches peels away when pulling sharply on an adhesive tape applied to the scratched area. Surprisingly, the adherence of the primer in which the zinc chromate had been replaced by an equal amount of "Pigment 1A" prepared according to the Example hereof, was better than that of the zinc chromate primer. On the other hand, the adherence of the primer in which the zinc chromate had been replaced with an equal amount of "Pigment 1B", while being better than that of the primer containing inert pigments only, did not equal that of the zinc chromate primer.

(b) two-coat system applications (primer plus finish):
After 600 hours testing, the sheets painted with the system in which the primer contained inert pigments instead of zinc chromate exhibited generalised corrosion, both around the scratches and in areas distant from the scratches. The sheets painted with the system in which the primer contained zinc chromate exhibited a good appearance in the areas removed from the cut, but around the latter there was to be observed a first area in which the paint had peeled and a second area where blistering was to be observed. This responds to the well-known cathodic delamination phenomenon and to the high solubility of the zinc chromate. The sheets painted with the systems in which the primer contained either "Pigment 1A" or "Pigment 1B", prepared according to the present Example, exhibited a good general appearance, without signs of delamination or blistering.

(2) Immersion tests of painted plates in distilled water:

A paint appropriate for use as room temperature drying corrosion inhibiting primer was prepared in a laboratory sand mill, with the following formula (v% and wt%):

| | v % | wt % |
|---|---|---|
| Zinc chromate | 6.58% | 19.20% |
| Micronized talc | 6.58% | 15.19% |
| Epoxy resin, solids | 17.60% | 17.60% |
| Polyamide resin, solids | 16.24% | 13.54% |

-continued

|  | v % | wt % |
|---|---|---|
| Methylisobutylketone (epoxy resin solvent) | 27.07% | 17.60% |
| Methylisobutylketone (polyamide resin solvent) | 5.21% | 3.39% |
| Methylisobutylketone (paint thinner) | 20.72% | 13.47% |

Cold rolled steel sheet, previously abraded and degreased to be free from rust and any other surface pollutant, was painted with this paint. Two different dry thicknesses, i.e. 15 microns and 25 microns, were used. After the primer had dried, a constant 50 micron thick finish coat of polyurethane pigmented with $TiO_2$ at a pigment volume concentration (PVC) of 20% was applied in all cases.

A further two paints were prepared separately, having the same volume percentage formula as the zinc chromate paint, with the sole exception that this pigment was replaced in one of them by the same volume of a pigment prepared as described for "Pigment 1A" in Example 1 and, in the other by the same volume of a regular zinc phosphate. For a better understanding, the v% and wt% of said paints are given below:

|  | volume | weight |
|---|---|---|
| Pigment 1A, according to Example 1 | 6.58% | 16.92% |
| Micronized talc | 6.58% | 15.62% |
| Epoxy resin, solids | 17.60% | 18.10% |
| Polyamide resin, solids | 16.24% | 13.92% |
| Methylisobutylketone (epoxy resin solvent) | 27.07% | 18.10% |
| Methylisobutylketone (polyamide resin solvent) | 5.21% | 3.48% |
| Methylisobutylketone (paint thinner) | 20.72% | 13.85% |
| Zinc phosphate | 6.58% | 18.30% |
| Micronized talc | 6.58% | 15.36% |
| Epoxy resin, solids | 17.60% | 17.80% |
| Polyamide resin (solids) | 16.24% | 13.62% |
| Methylisobutylketone (epoxy resin solvent) | 27.07% | 17.80% |
| Methylisobutylketone (polyamide resin solvent) | 5.21% | 3.42% |
| Methylisobutylketone (paint thinner) | 20.72% | 13.62% |

Both paints were used to paint sheets in a similar way as to described in connection with the zinc chromate paint.

Four days after the application of the polyurethane and $TiO_2$ finish coat to all the sheets painted in this section, six in all, they were all submerged vertically in a container with distilled water at 50° C. All the test specimens were held in the container for 4 days, with the water temperature held constantly at 50° C., under stirring, using a flow thermostat.

After the 4 day immersion test, the sheets were taken out of the water, dried and examined, with the following results: the test specimens painted with the system in which the epoxy-polyamide primer contained zinc phosphate as corrosion inhibiting pigment exhibited extensive blistering, more extensive and with smaller blisters in the case of the 15 micron dry primer thickness and less extensive and larger blisters in the 25 micron thick primer application. When an attempt was made to peel the coat of paint with a spatula, in order to study the state of the substrate the adherence was observed to be practically non-existent, it being possible to peel the whole of the paint from a 90×140 mm specimen in a few seconds. A small rust stain was observed under each of the blisters in the sheets having the thinner primer coat, whereas rust stains were observed under the blisters on the sheets having the thicker primer coat, without them being so generalised. In turn, the test specimens painted with the zinc chromate containing primer exhibited some blistering of appreciable size, although less numerous than with the zinc phosphate. When an attempt was made to peel the coat of paint with a spatula, the adherence was observed to be very good, it being impossible to peel the film away continuously as was the case with the zinc phosphate. Furthermore, with the thicker coat, no rust stain was observed under the blisters that had formed. No blistering at either coat thickness was observed in the test specimens painted with the system containing "Pigment 1A" as corrosion inhibiting pigment and when an attempt was made to peel the paint with a spatula, the adherence was observed to be comparable with that observed for zinc chromate.

What We claim is:

1. A corrosion inhibiting pigment, characterised in that it comprises a mixture of a crystalline phase and an amorphous phase in which the crystalline phase represents from 10 to 70 wt % of the mixture and is constituted by zinc phosphate in the form of generally spheroidal particles having a maximum dimension lying between 0.5 and 5 microns and the amorphous phase represents correspondingly from 90 to 30 wt % and comprises ferric phosphate and ferrous phosphate in a mole ratio lying between 1:0.001 and 1:0.3.

2. The pigment of claim 1, characterised in that said amorphous phase consists of a hydrated powdery product formed by particles of a size not in excess of 15 microns.

3. The pigment of claim 1, characterised in that said amorphous phase is formed by ferric phosphate, ferrous phosphate, ferric oxide and water of crystallisation.

4. The pigment of claim 3, characterised in that in said amorphous phase the mole ratio between ferric phosphate and ferric oxide lies between 1:0 and 1:0.5.

5. The pigment of claim 3, characterised in that in said amorphous phase, the mole ratio between ferric phosphate and water is between 1:2 and 1:6.

6. The pigment of claim 1, characterised in that in said phase mixture, the mole ratio between ferric phosphate and zinc phosphate lies between 1:0.1 and 1:0.6.

7. The pigment of claim 1, characterised in that it has a soluble extract of less than 15 mg/100 ml water when determined at 23° C.

8. A corrosion inhibiting primer comprising at least an organic binder and a pigment according to any one of the previous claims.

9. A process for the manufacture of a corrosion inhibiting pigment, formed by an association of a crystalline phase and an amorphous phase, in which the crystalline phase represents from 10 to 70 wt % of the association and is formed by zinc phosphate in the form of generally spheroidal particles having maximum dimensions lying between 0.5 and 5 microns and the amorphous phase represents from 30 to 90 wt % of the association and comprises ferric phosphate and ferrous phosphate in a mole ratio lying between 1:0.001 and 1:0.3, characterised in that it comprises the following steps, listed without implying any particular order of preference: (a) reacting a ferrous salt with a phosphate ion containing compound to give ferrous phosphate; (b) washing of said ferrous phosphate; (c) drying and oxidising of said ferrous phosphate to give an oxidation product maintaining a divalent iron content lying between 0.2 and 47 wt % of the total iron present in the oxidation product; and (d) associating with a crystalline phase constituted by zinc phosphate.

10. The process of claim 9, characterised in that said association step (d) is carried out between the zinc phosphate and said oxidation product.

11. The process of claim 10, characterised in that said association step (d) is carried out between the zinc phosphate and the ferrous phosphate.

12. The process of claim 11, characterised in that said association is micronised.

13. The process of claim 9, characterised in that said ferrous salt is ferrous sulfate and said phosphate ion containing compound is phosphoric acid or a soluble salt of said acid.

* * * * *